United States Patent [19]

Konno

[11] 3,730,997

[45] May 1, 1973

[54] METHOD AND APPARATUS FOR REMOTELY MANIPULATING AN AUTOMATIC TELEPHONE ANSWERING DEVICE

[75] Inventor: Akira Konno, Tokyo, Japan

[73] Assignee: Pioneer Electronic Corporation

[22] Filed: May 19, 1970

[21] Appl. No.: 38,854

[30] Foreign Application Priority Data

May 19, 1969 Japan ....................44/38088

[52] U.S. Cl. ....................179/6, 179/6 E

[51] Int. Cl. ....................H04m 1/64

[58] Field of Search ....................179/6 R, 6 E

[56] References Cited

UNITED STATES PATENTS 3,511,934 5/1970 Mizuno ....................179/6 E 3,511,935 5/1970 Mizuno ....................179/6 E 3,310,629 3/1967 Yamamoto et al. ....................179/6 E 3,293,365 12/1966 Mitsui ....................179/6 E

*Primary Examiner*—Richard Murray

*Assistant Examiner*—Barry Leibowitz

*Attorney*—Sughrue, Rothwell, Mion, Zinn & Macpeak

[57] ABSTRACT

This is a device for remotely listening to a message of a calling party previously recorded in a telephone answering device in the owner's absence. This is accomplished by providing a first and second track in one message recording tape, for recording the message signal from a calling party. The recorded message signal from the calling party and a remote manipulating signal sent by a remote manipulating person are on the first track, and only the remote manipulating signal recorded through a filter circuit is on the second track. When the message signal from the calling party recorded on the first track is remotely listened to all functions of the device are returned to the stand-by state by the use of the remote manipulating signal which is read out from the second track after all of the message signals have been read out.

4 Claims, 4 Drawing Figures

METHOD AND APPARATUS FOR REMOTELY MANIPULATING AN AUTOMATIC TELEPHONE ANSWERING DEVICE

BACKGROUND OF THE INVENTION

1. Field of the Invention

This invention relates to a remote manipulating method used where a specified person, such as an owner of a telephone automatic answering device (a telephone caretaker device), desires at a remote place to remotely listen to a message from a calling party recorded in that device.

2. Description of the Prior Art

In the prior art, mainly two remote manipulating methods have been proposed.

The first method is simplified as comprising the steps of dividing one message recording tape for recording a message from a calling party into a first track and a second track, recording only a message signal of the calling party in the first track, and recording continuously a control signal in the second track during the time when a device is in a recording mode to record the message signal of the calling party, even if the message signal is intermittent. If the owner of this device sends a specified remote manipulating signal to his device through a telephone line, that device rewinds the message recording tape and reproduces the message of the calling party from the beginning of that tape. During this playback operation, by the use of the control signal recorded in the second track the device is maintained in a talking state up to the time when that control signal ceases, thereby the owner can remote-listen to the whole message from the calling party.

Similarly, the second method can be simplified as follows: there is provided only one track in one message recording tape for recording the message from the calling party. If the device owner sends a specified remote manipulating signal through the telephone line when the device is switched to a recording mode to record a message, that signal is recorded in the message recording tape in place of the message, and, at the same time, the device rewinds at once in response to that signal passed through a filter circuit and then reproduces the message of the calling party from the beginning of the tape. After the message has been totally read out, the remote manipulating signal is read out. This reproduced remote manipulating signal passes again through a filter circuit to cause the device to return to its initial stand-by state (which state is to wait for a next calling signal).

In the above-mentioned first method, it is necessary to provide an oscillator circuit for generating the control signal for the purpose of recording it in the second track, and, since the control signal must be recorded continuously even if the message signal to be recorded in the first track is intermittent, the recording of the control signal is continued for a period after the message signal has terminated. Accordingly, not only is the tape used needlessly, but also there is the inconvenience of not knowing for a period whether the message from the calling party has been totally read out or a message from a next calling party will be read out a short time later.

In the above-mentioned second method, the disadvantage of the tape being used needlessly is overcome, however, the method requires two filter circuits, because it reads out through a filter circuit the remote control signal having been recorded and uses that signal by passing it through a filter circuit to effect a recovery action of the device to the stand-by state. Further, if the tape speed fluctuates or if a "wow" or "-flutter" phenomenon occurs, the frequency of the remote control signal differs between its recording and playback periods. This presents a danger of misoperation because that signal can not pass through the filter circuit during the playback. In the telephone automatic answering device used mainly in owner's absence, the unrecoverable situation as above is very dangerous, and the telephone line tends to be occupied needlessly. Furthermore, if the pass band width of the filter circuit were made somewhat wider based upon an estimated frequency fluctuation, the discriminative capacity between the message signal and the remote control signal decreases, thus, there is a disadvantage of misoperation causing the device to return to the stand-by state during the playback of the message signal.

SUMMARY OF THE INVENTION

The present invention of a remote manipulating method of a telephone automatic answering device is characterized in that it comprises the steps of providing a first and second track in one message recording tape for recording the message signal from a calling party. The recorded message signal from the calling party and a remote manipulating signal sent by a remotely manipulating person are recorded in the first track, and only the remote manipulating signal recorded through a filter circuit is on the second track. When the message signal from the calling party recorded in the first track is remotely listened to, all functions of the device are returned to the stand-by state by the use of the remote manipulating signal which is read out from the second track after all of the message signals have been read out.

Therefore, it is an object of the present invention to provide an improved and novel remote manipulating method of a telephone automatic answering device.

Other objects and advantages of the present invention will further become apparent hereinafter and from the drawings.

BRIEF DESCRIPTION OF THE DRAWINGS

The appended drawings are provided for the purpose of explaining a method for manipulating remotely a telephone automatic answering device according to the present invention, wherein.

DESCRIPTION OF THE PREFERRED EMBODIMENT

Figure 1:
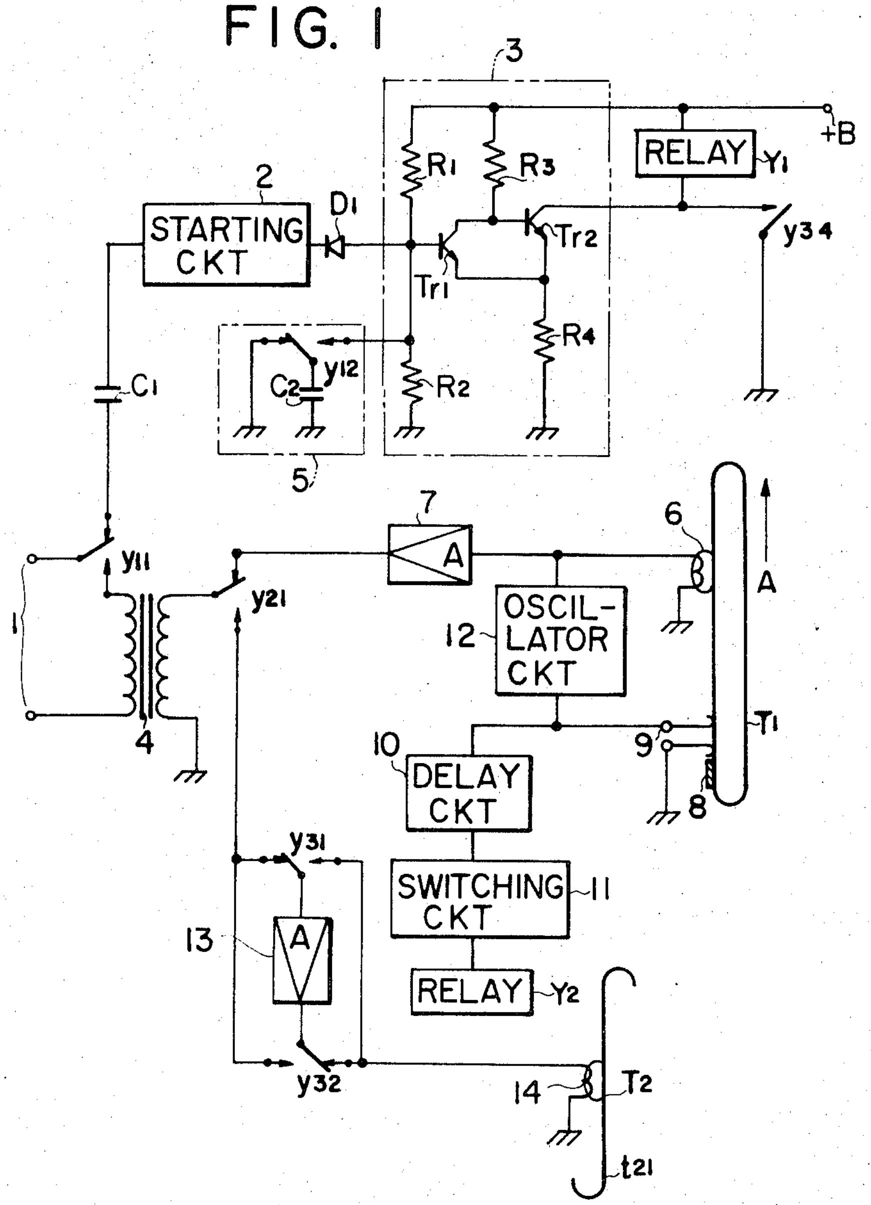
FIG. 1 is a circuit diagram for a general answering operation.

In FIG. 1, if a calling signal (a bell signal) arrives at a connection terminal 1 of the telephone line, the signal is fed to a starting circuit 2 through a contact y11 of a relay Y1 and a coupling capacitor C1. Three to 10 seconds after the first calling signal arrives, the starting circuit 2 changes the base potential of a transistor Tr1 of a switching circuit 3 to ground through a diode D. Transistors Tr1 and Tr2 together with resistors R1 through R4 form a Schmitt trigger circuit. During the stand-by state awaiting the calling signal, the transistor Tr1 is in the conductive state (hereinafter referred to as "ON". If the base of the transistor Tr1 is grounded, the Schmitt trigger circuit is switched resulting in the transistor Tr1 turning OFF and the transistor Tr2 turning ON. Consequently, the relay Y1 operates to switch its respective contacts. By a contact *y*11 the telephone line is connected to a transformer 4. A capacitor C2, in a timer circuit 5, is held in an uncharged state by means of a contact *y*12 It is connected to the base of the transistor Tr1 by the switching of contact y12 and charged up gradually through the resistor R1. In consequence of switching of the contact *y*11 the operation of the starting circuit 2 stops; but, up to the time when the capacitor C2 is charged to a predetermined voltage, the transistor Tr1 is OFF, thus, the relay Y1 continues to operate. When the tape drive mechanism starts its operation by means of a contact (not shown) of the relay Y1 tape T1 runs in the arrow A direction. The message previously recorded in the message tape T1 is reproduced by a magnetic head 6, amplified by an amplifier 7, and sent to the calling party through a contact *y*21 of a relay Y2, the transformer 4 and the connection terminal 1 to the telephone line.

The message tape T1 is of the endless type and, when it makes one revolution, a conductive foil 8 affixed to the tape short-circuits electrodes 9 and activates a delay circuit 10. This delay circuit 10 after its delay time (1 to 2 seconds) activates a switching circuit 11 and thereby energizes the relay Y2. When the electrodes 9 are short-circuited by the conductive foil 8, an oscillator circuit 12 operates concurrently with the delay circuit 10 and generates a signal tone called a "-beep tone" for informing the calling party of the fact that the message has been completed, and, the device is going to switch to a recording state to record the message of the calling party. In consequence of the operation of the relay Y2, a contact (not shown) switches to stop the tape T1, and to start a message recording tape T2. Further, an input terminal of an amplifier 13 is connected through a contact *y*31 of a relay Y3 and contact *y*21 to the transformer 4. The conductive foil 8 moves past the electrodes 9 during this delay time, thus, no longer making contact with the electrodes 9.

Figure 3:
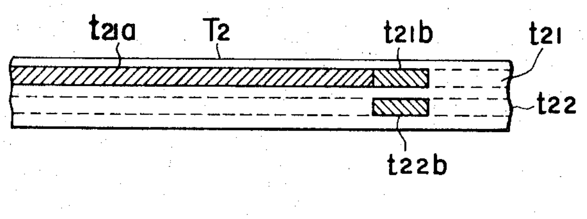
FIG. 3 is a view showing a recorded state of a message recording tape shown in FIGS. 1 and 2.

The message signal from the calling party passes through the connection terminal 1, the contact *y*11, transformer 4, and the contacts *y*21 and *y*31 and is amplified in the amplifier 13 and, through a contact *y*32, recorded in the first track *t*21 (see FIG. 3) of the message recording tape T2 by a magnetic head 14. When the time interval of the timer circuit 5 has lapsed, switching circuit 3 de-energizes relay Y1 and all mechanisms of the device return to the stand-by state to await the next calling signal. The foregoing is the normal automatic answering operation.

Figure 2:
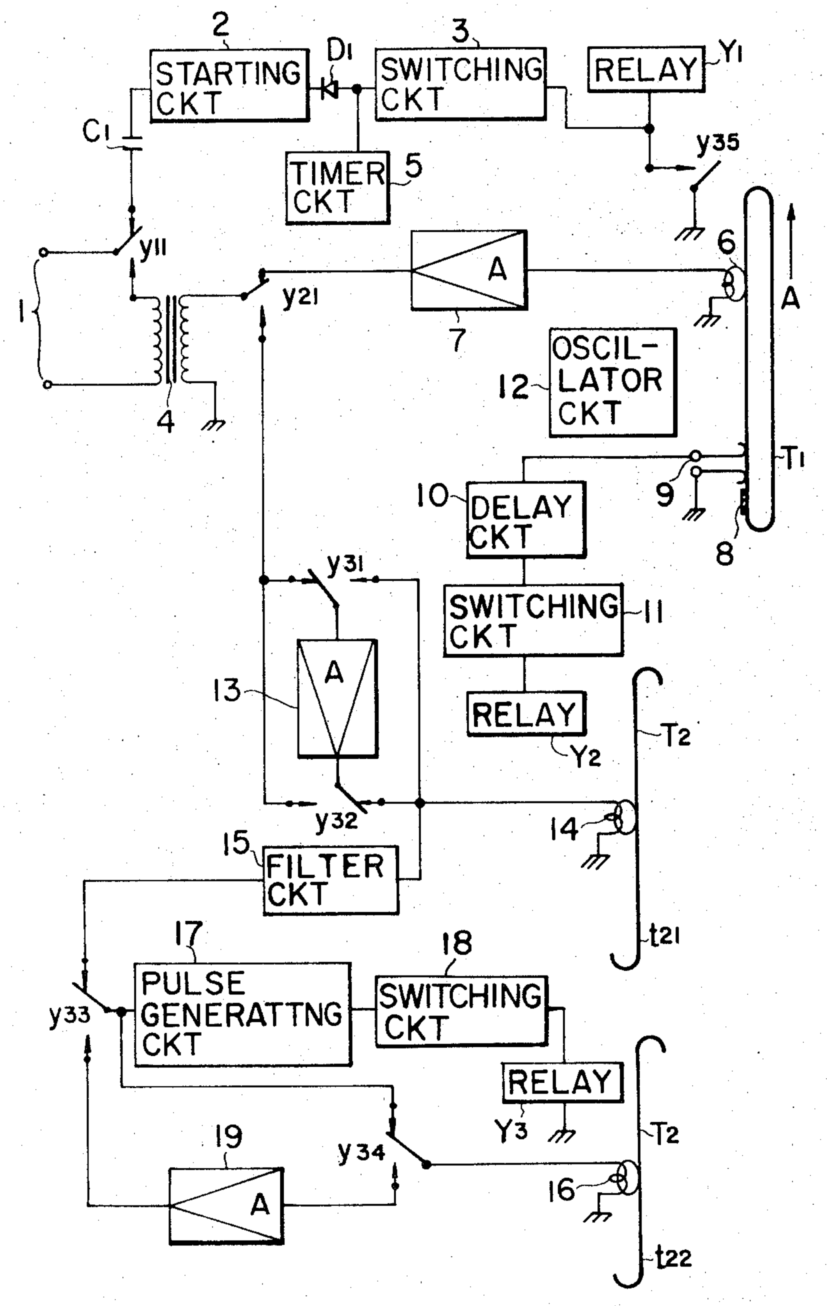
FIG. 2 is a simplified circuit diagram used to explain an operation resulting from a remote manipulation.
Figure 4:
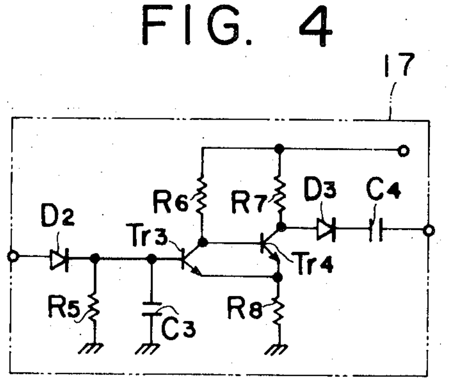
FIG. 4 is a circuit diagram illustrating an example of a pulse generating circuit shown in FIG. 2.

The device to effect remote listening is shown in FIG. 2. The operation of the device from running of the message recording tape T2 on arrival of the calling signal to the device switching to an incoming message recording condition is exactly the same as explained in relation to FIG. 1. If a specified person (mainly, the owner of the device) sends a specified remote manipulating signal at the time when there exists the message recording condition, this signal is recorded in the first track *t*21 ("*t*21*b*" in FIG. 3) of the message recording tape T2 shown in FIG. 3 in the same manner as a normal message signal is recorded. At the same time the signal is applied to a control circuit comprising filter circuit 15, pulse generator circuit 17 and switching circuit 18. This signal passes through the filter circuit 15 capable of passing only it and, through contacts y33 and y34 of a relay Y3, it is recorded on the second track *t*22 ("*t*22*b*" in FIG. 3) of the message recording tape T2 by means of a magnetic head 16. The signal which passed through the filter circuit 15 is also applied to the pulse generating circuit 17 to activate the same. The pulse generating circuit 17 is shown in FIG. 4. A signal rectified by diode D2 charges capacitor C3. When the voltage across the capacitor C3 reaches a predetermined voltage, a transistor Tr3 turns ON, thus, a transistor Tr4 turns OFF, the collector potential of the transistor Tr4 becomes high, and a pulse signal is sent out through a diode D3 and a capacitor C4. Thus, after a delay time (1 to 2 seconds) caused by the charging of capacitor C3, one pulse is sent to a switching circuit 18. The switching circuit 18 then energizes the relay Y3. The switching circuit is may be a bistable multivibrator for example and, as long as there appears no pulse input, the relay Y3 is energized continuously. By means of a contact *y*35 of the relay Y3 the relay Y1 is grounded, thus, even if the limited time of the timer circuit 5 lapses and the transistor Tr2 of the switching circuit turns OFF, the relay Y1 continues to operate, accordingly, the whole device is maintained in the talking state. If the relay Y3 operates the message recording tape T2 is rewound in response to switching of a contact (not shown) and, when the rewinding of that tape has completed, the conductive foil affixed to the starting end of the tape short-circuits the electrodes. This reverses the direction of the tape and the tape is played back at a constant speed. The message signal ("*t*21*a*" in FIG. 3) from the calling party recorded in the first track *t*21 of the message recording tape T2 is reproduced sequentially by the magnetic head 14, through the contact *y*31, amplified by the amplifier 13, and sent to the remotely manipulating person through the contacts *y*32 and *y*21, the transformer 4, and the contact *y*11. After the recorded message signal has been reproduced and read out in whole, the remote manipulating signal *t*21*b* last recorded in the first track *t*21 is reproduced and read out, thereby the remotely manipulating person knows he has listened to the whole message signal.

The remote manipulating signal *t*22*b* recorded in the second track *t*22 is simultaneously read out and applied to the pulse generating circuit 17 through the contact *y*34, the amplifier 19 and the contact *y*33. In the same manner as the above operation, the pulse generating circuit 17, after a delay time, sends one pulse to the switching circuit 18 causing it to switch and in turn to stop the energization of relay Y3. In response to the recovery operation of the relay Y3 the relay Y1 is released from its energized state, and the device returns to its stand-by state.

In the above explanation, the remote manipulating signal *t21b* recorded in the first track was reproduced and sent out in order to make the remotely manipulating person clearly aware of the fact that the entire message signal was played out. If this is not needed, it is possible to immediately return the device to the standby state by applying the remote manipulating signal *t22b* reproduced by the magnetic head 16 from the second track *t22* to the switching circuit 18 through an appropriate rectifier circuit, a differentiation circuit or the like, instead of applying the signal to the pulse generating circuit 17.

According to the present invention, as described, it is unnecessary to provide a special oscillator circuit and record the generated signal of that oscillator circuit concurrently with recording of the message signal as is necessary in the aforementioned prior art first method. Furthermore, there is no inconvenience in which the tape is used needlessly due to continued recording of the generated signal after the message signal has terminated. Further, the present method does not occupy the telephone line needlessly because the device is returned to the stand-by state at the termination of the message signal.

Furthermore, according to the present invention, the possibility of misoperation which occurs when the tape speed fluctuates as discussed in the aforementioned prior art second method is eliminated. In the present invention, the resetting of the device occurs if it is possible to discriminate between the presence or absence of a signal in the second track of the message recording tape T2 irrespective of the fluctuation of frequency. Thereby, the safety and reliability of the telephone automatic answering device which is significantly improved.

While a preferred embodiment of the invention has been described herein, it is appreciated that variations and modifications may be made without departing from the spirit of the invention.

What is claimed is:

1. A method for remote manipulation of a telephone state during which incoming messages from a calling party are sequentially recorded on one track of a two track tape said method comprising the steps of:

a. recording a remote manipulating signal sent over the telephone line by a remote manipulating calling party on the first track of the tape;
b. recording the remote manipulating signal through a filter circuit on the second track of the tape;
c. returning the tape to its initial position in response to receipt of the remote manipulating signal generated by said remote manipulating calling party where the beginning of the first of the sequentially recorded incoming messages are recorded;
d. playing back to the calling party over the telephone line the sequentially recorded incoming messages, and
e. using the remote manipulating signal recorded on the second track to return the answering device to its stand-by state after all of the sequentially recorded incoming messages have been played back to the remote manipulating calling party.

2. The method as set forth in claim 1, further including playing back said remote manipulating signal recorded on said first track simultaneously with using the remote manipulating signal recorded on the second track to return the answering device to its stand-by state.

3. A remotely operated automatic telephone answering device which has a stand-by state and a recording state during which incoming messages from a calling party are sequentially recorded on one track of a two track tape said device comprising:

a. first recording means for recording said incoming messages and a remote manipulating signal generated by a remote manipulating calling party on said first track.
b. second recording means for recording said remote manipulating signal of said second track,
c. playback means for playing back over the telephone line the recorded incoming message signals and the recorded remote manipulating signal recorded on said first track of said tape and for playing back the remote manipulating signal recorded on the second track of said tape;
d. control means, responsive to the receipt of said remote manipulating signal, for controlling the operation of said playback means and responsive to the playing back of said remote manipulating signal recorded on said second track of said tape for returning the device to its stand-by state.

4. The device as set forth in claim 3, wherein said control means includes a filter means, a pulse generator circuit means coupled to said filter means, and switching means responsive to said pulse generator circuit means, said switching means controlling the operation of said playback means.

* * * * *